E. P. CLAUSS.
CUT-OFF AND RELIEF VALVE FOR AIR BRAKES.
APPLICATION FILED AUG. 1, 1919.
1,350,138. Patented Aug. 17, 1920.
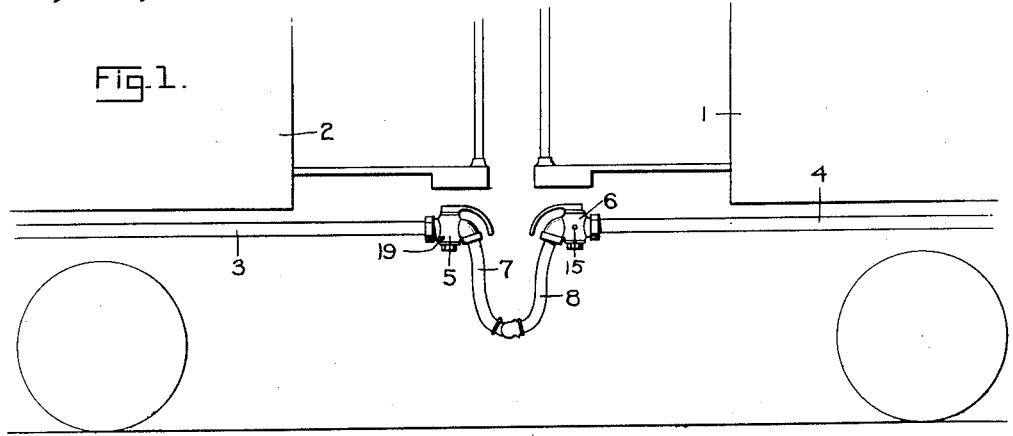
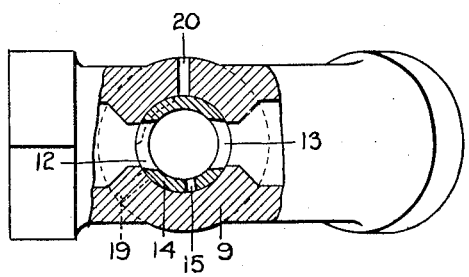
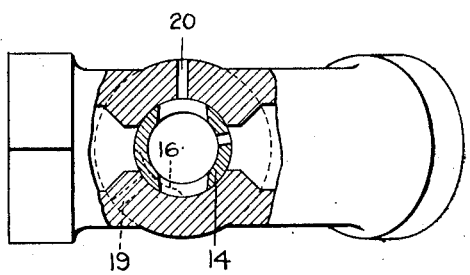
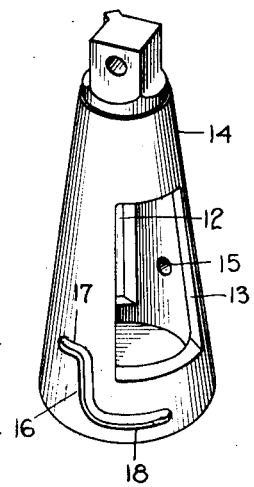
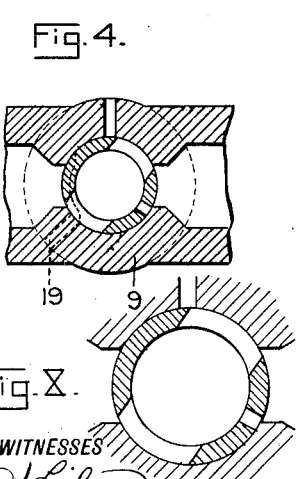
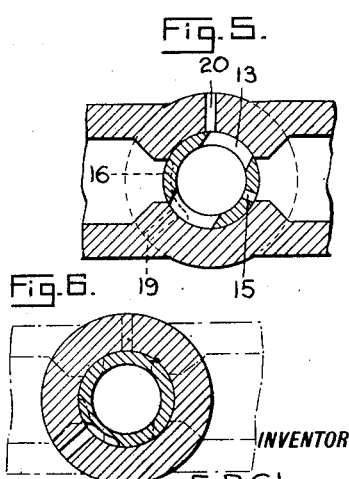
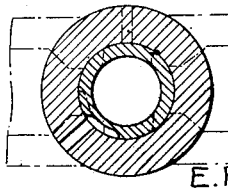
WITNESSES
INVENTOR
E. P. Clauss
BY
ATTORNEYS

UNITED STATES PATENT OFFICE.

EDWARD P. CLAUSS, OF LYONS, NEW YORK.

CUT-OFF AND RELIEF VALVE FOR AIR-BRAKES.

1,350,138.

Specification of Letters Patent.    Patented Aug. 17, 1920.

Application filed August 1, 1919. Serial No. 314,623.

*To all whom it may concern:*

Be it known that I, EDWARD P. CLAUSS, a citizen of the United States, and a resident of Lyons, in the county of Wayne and State of New York, have invented a new and useful Cut-Off and Relief Valve for Air-Brakes, of which the following is a full, clear, and exact description.

This invention relates to relief and cut-off valves for air brake systems commonly known as angle cocks, and has for an object to provide an improved construction which will act as an angle cock substantially in the usual manner, but will also act to bleed the system when turned off.

Another object of the invention is to provide an angle cock which will bleed the system when turned off both in front and rear of the cock.

A still further object of the invention is to provide an angle cock adapted to bleed the air brake system when turned off and to be arranged so as to be unlappable.

In the accompanying drawing:

Figure 1 is a view showing fragmentary parts of adjacent cars with a pair of angle cocks disclosing an embodiment of the invention.

Fig. 2 is a fragmentary central longitudinal horizontal section through the center of one of the cocks shown in Fig. 1, illustrating the construction of the valve member therein.

Fig. 3 is a view similar to Fig. 1, but showing the valve member turned to a closed position.

Fig. 4 is a fragmentary sectional view similar to Fig. 3, but showing the valve member in a half open and half closed position.

Fig. 5 is a view similar to Fig. 4, but with the parts moved a short distance farther toward a closed position so that the principal ports of the valve member are out of communication with the passageway in the casing.

Fig. 6 is a view similar to Fig. 5, but taken on a lower line so as to pass through the lower part of the bleeding passageway of the valve member illustrated in Fig. 7.

Fig. 7 is an enlarged detail perspective view of the valve member removed, showing the bleeding aperture and the bleeding passageway.

Referring to the accompanying drawing by numerals 1 and 2 indicate cars provided with pipes 3 and 4 forming part of the air brake system, said pipes being provided with angle cocks 5 and 6 connected by suitable hose 7 and 8, said hose being of the usual construction, while the angle cocks 5 and 6 are of a special construction as illustrated particularly in Figs. 2 to 6 inclusive. Each of these cocks is provided with a casing 9 of substantially usual construction having ports 10 and 11 coacting with ports 12 and 13 of the valve member 14. This valve member is tapered in the usual manner as shown in Fig. 6, and not only provided with the ports 12 and 13, but with a bleeding opening or hole 15 and bleeding passageway 16. This passageway is provided with a horizontal section 17 adapted to be brought into registry with the port 10, while the horizontal passageway 18 is adapted to be brought into registry with the bleeding aperture 19 of casing 9. The hole or aperture 15 is adapted to be brought into registry with the port 11 as shown in Fig. 3 when the port 13 is in registry with the bleeding port 20. When the valve member 14 is in the position shown in Fig. 2 the train line is open and is under the control of the engineer in the usual manner. If, for any reason, any one should turn the valve member partially closed, as shown in Fig. 4, the line is under the control of the engineer still, though not sufficiently to put on the emergency brake. However, when the valve member has been turned to this position pressure will leak from the line to the bleeding passageway 16 and the bleeding port 19 whereby the brakes will gradually be applied without any action of the engineer, said bleeding gradually overcoming the action of the pump. In case the valve is closed to the position shown in Fig. 5, which is slightly farther than that shown in Fig. 4, all of the train line rear of the valve is shut off from the engine, but is freely bleeding through the passageway 16 and the bleeding port 19, while the part of the system between the pipe and the engine is slowly bleeding through the aperture or hole 15 and through the port 13 into the port 20 and from thence to the atmosphere. In case the valve member 14 is stopped at a position between that shown in Fig. 4 and that shown in Fig. 5 there will be an exhaust bleeding into the air from the port 11 through the passageway 13 to the bleeding port 20. Some of the air will also bleed from the line back of the valve through the port 10, through the passageway 12 and from thence out through passageway 13 to the bleeding port 20. While this is taking place some of the air on the opposite side of the valve to the engine will pass through the passageway 16 and bleeding port 19. Only a slight opening has been shown in the drawing, but it is evident that a greater opening could be provided without departing from the spirit of the invention, said larger opening permitting a quicker bleeding and also causing the device to not take the control entirely from the engineer. When the parts are moved to their full closed position as shown in Fig. 3 the bleeding ports 15 and 19 will be fully open so that a full relief is secured and the entire train line is bled so that the brakes will be applied with reasonable speed, though not as quick as the emergency would apply the same. It is, of course, understood that the various bleeding ports may be made of any desired size so as to produce a bleeding action fast or slow.

In connection with the general shape and construction of the valves 5 and 6 it may be stated that they are constructed exactly like the ordinary angle cocks now in use except for the ports 19 and 20, port 15 and passageway 16 and the way these parts are located in respect to the remaining ports or passageways of the valve. The provision and positioning of these ports as described causes the valve to be an unlapable valve whereby the engineer will be in full control of the system, or the system will be bleeding. In order to permit the engine to pull a train of cars the rear valve or angle cock is shut off and the hose 7 or 8, as the case may be, is coupled with what is known as a dummy coupler mounted on the last car. After this coupling has been made the last valve or angle cock is turned on. As the last coupling is a dummy air cannot pass from the line so that the pump on the engine will soon provide a sufficient pressure to loosen the brakes unless this has already been done. This arrangement at the rear of the train also produces the additional advantage of preventing the depending hose to accidentally strike anything and become injured.

What I claim is:

1. A cut-off and relief valve for air brake systems of trains comprising a valve casing having a passageway therethrough, a rotatable valve member having a passageway therethrough adapted to be brought into registry with the passageway in the casing when the valve member is open, said valve member having an aperture positioned substantially at right angles to the passageway through the valve member, said aperture merging into the passageway in said valve member and with a tortuous bleeding passageway in the face of the valve member, said tortuous passageway having a horizontal section positioned substantially diametrically opposite said aperture, a longitudinal section, and a second horizontal section extending beneath the passageway in the valve member, and a pair of bleeding ports arranged in the casing, one co-acting with said bleeding passageway, and the other with the port in the valve member.

2. A cut-off and relief valve for air brake systems of trains comprising a casing having a main passageway therethrough and a pair of bleeding ports substantially on opposite sides, a valve member arranged in the casing having a passageway therethrough positioned to shut off the passageway in the casing when turned to a closed position, and a plurality of bleeding ports in the valve member, all of said ports co-acting to permit a free flowing of air through the valve when the valve member is in an open position and to bleed the system in both directions as soon as the valve is closed sufficiently to take the control from the engineer one of said bleeding ports in the valve member merging into the passageways thereof.

EDWARD P. CLAUSS.